US007765274B2

(12) United States Patent
Kasriel et al.

(10) Patent No.: US 7,765,274 B2
(45) Date of Patent: *Jul. 27, 2010

(54) DIFFERENTIAL CACHING WITH TEMPLATE, SUB-TEMPLATE, AND DELTA INFORMATION

(75) Inventors: Stephane Kasriel, San Francisco, CA (US); Walter Mann, San Francisco, CA (US); Xavier Casanova, San Jose, CA (US)

(73) Assignee: Digital River, Inc., Eden Prairie, MN (US)

(*) Notice: Subject to any disclaimer, the term of this patent is extended or adjusted under 35 U.S.C. 154(b) by 334 days.

This patent is subject to a terminal disclaimer.

(21) Appl. No.: 11/203,041

(22) Filed: Aug. 12, 2005

(65) Prior Publication Data
US 2006/0031379 A1 Feb. 9, 2006

Related U.S. Application Data

(63) Continuation of application No. 09/923,292, filed on Aug. 6, 2001, now Pat. No. 7,092,997.

(51) Int. Cl.
*G06F 15/16* (2006.01)
*G06F 15/167* (2006.01)
*G06F 15/173* (2006.01)

(52) U.S. Cl. .................. 709/217; 709/203; 709/213; 709/236; 709/238; 709/231; 709/246

(58) Field of Classification Search .............. 709/201, 709/217, 213, 246, 231, 238, 236, 203
See application file for complete search history.

(56) References Cited

U.S. PATENT DOCUMENTS

| 5,680,634 A | 10/1997 | Estes |
| 5,727,129 A | 3/1998 | Barrett et al. |
| 5,728,129 A | 3/1998 | Summers |
| 5,774,660 A | 6/1998 | Brendel et al. |
| 5,802,292 A | 9/1998 | Mogul |

(Continued)

FOREIGN PATENT DOCUMENTS

| DE | 010146356 A1 | 4/2003 |
| EP | 001662405 A1 | 5/2006 |
| JP | 02003132086 A1 | 5/2003 |
| WO | WO00/28433 A2 | 5/2000 |
| WO | WO00/28433 A3 | 5/2000 |
| WO | 02054258 A1 | 7/2002 |

(Continued)

OTHER PUBLICATIONS

"Scalable Web Clusters with Static and Dynamic Contents" Casalicchio, E. Colajanni, M., IEEE International Proceedings on Conference Cluster Computing, pp. 170-177, Nov. 2000.

(Continued)

*Primary Examiner*—John Follansbee
*Assistant Examiner*—Kamal B Divecha
(74) *Attorney, Agent, or Firm*—North Oaks Patent Agency; Shawn B. Dempster

(57) ABSTRACT

A method for transmitting a web page to a client device is described. Template information, sub-template information, and delta information are identified based on a request for information from the client device. The template information includes seldom changing elements of a web page. The sub-template information includes: (i) information that changes less frequently than delta information, and (ii) elements of a web page shared by several templates. At least one of the template information, sub-template information, and delta information is retrieved from a location other than an originating server that is the original provider of information requested by the client device. The request is responded to by sending to the client device the template information, sub-template information and delta information. In addition, a system for transmitting a web page to a client device is described.

20 Claims, 2 Drawing Sheets

U.S. PATENT DOCUMENTS

| | | | |
|---|---|---|---|
| 5,826,258 | A | 10/1998 | Gupta et al. |
| 5,835,712 | A * | 11/1998 | DuFresne .................. 709/203 |
| 5,845,088 | A | 12/1998 | Lewis |
| 5,859,971 | A | 1/1999 | Bittinger |
| 5,870,546 | A * | 2/1999 | Kirsch ........................ 709/205 |
| 5,878,223 | A | 3/1999 | Becker |
| 5,878,429 | A | 3/1999 | Morris |
| 5,931,904 | A * | 8/1999 | Banga et al. ................. 709/217 |
| 5,944,790 | A | 8/1999 | Levy |
| 5,978,841 | A | 11/1999 | Berger |
| 5,983,227 | A | 11/1999 | Nazem |
| 5,987,480 | A * | 11/1999 | Donohue et al. ......... 715/501.1 |
| 6,003,087 | A | 12/1999 | Housel |
| 6,021,426 | A * | 2/2000 | Douglis et al. .............. 709/200 |
| 6,026,413 | A | 2/2000 | Challenger |
| 6,061,715 | A * | 5/2000 | Hawes ........................ 709/203 |
| 6,067,565 | A | 5/2000 | Horvitz |
| 6,085,193 | A | 7/2000 | Malkin et al. |
| 6,094,662 | A | 7/2000 | Hawes |
| 6,098,152 | A | 8/2000 | Mounes-Toussi |
| 6,112,242 | A | 8/2000 | Jois |
| 6,128,655 | A * | 10/2000 | Fields et al. ................. 709/219 |
| 6,138,251 | A | 10/2000 | Murphy |
| 6,144,990 | A | 11/2000 | Brandt |
| 6,154,767 | A | 11/2000 | Altschuler |
| 6,178,461 | B1 | 1/2001 | Chan et al. |
| 6,192,382 | B1 * | 2/2001 | Lafer et al. ................. 715/513 |
| 6,216,212 | B1 | 4/2001 | Challenger |
| 6,249,795 | B1 * | 6/2001 | Douglis ...................... 715/511 |
| 6,249,844 | B1 | 6/2001 | Schloss et al. |
| 6,256,712 | B1 | 7/2001 | Challenger |
| 6,260,192 | B1 | 7/2001 | Rosin |
| 6,263,352 | B1 | 7/2001 | Cohen |
| 6,314,465 | B1 | 11/2001 | Paul |
| 6,327,628 | B1 | 12/2001 | Anuff |
| 6,343,318 | B1 | 1/2002 | Hawkins |
| 6,374,305 | B1 | 4/2002 | Gupta |
| 6,377,978 | B1 | 4/2002 | Nguyen |
| 6,397,217 | B1 * | 5/2002 | Melbin ........................ 707/10 |
| 6,405,252 | B1 | 6/2002 | Gupta |
| 6,430,624 | B1 * | 8/2002 | Jamtgaard et al. ........... 709/246 |
| 6,453,319 | B1 | 9/2002 | Mattis et al. |
| 6,457,103 | B1 * | 9/2002 | Challenger et al. .......... 711/133 |
| 6,466,937 | B1 | 10/2002 | Fascenda |
| 6,466,970 | B1 * | 10/2002 | Lee et al. ..................... 709/217 |
| 6,523,063 | B1 | 2/2003 | Miller et al. |
| 6,553,413 | B1 | 4/2003 | Lewin |
| 6,560,604 | B1 | 5/2003 | Fascenda |
| 6,605,120 | B1 * | 8/2003 | Fields et al. ................. 715/239 |
| 6,606,525 | B1 | 8/2003 | Muthuswamy et al. |
| 6,623,529 | B1 | 9/2003 | Lakritz |
| 6,629,138 | B1 | 9/2003 | Lambert |
| 6,697,844 | B1 | 2/2004 | Chan |
| 6,704,024 | B2 | 3/2004 | Robotham |
| 6,721,780 | B1 | 4/2004 | Kasriel |
| 6,728,785 | B1 | 4/2004 | Jungck |
| 6,760,746 | B1 | 7/2004 | Schneider |
| 6,792,475 | B1 * | 9/2004 | Arcuri et al. ................. 709/245 |
| 6,826,553 | B1 * | 11/2004 | DaCosta et al. ................ 707/1 |
| 6,826,614 | B1 | 11/2004 | Hanmann et al. |
| 6,857,012 | B2 | 2/2005 | Sim et al. |
| 6,859,910 | B2 | 2/2005 | Croy |
| 6,868,453 | B1 | 3/2005 | Watanabe |
| 6,873,877 | B1 | 3/2005 | Tobias et al. |
| 6,862,826 | B2 | 4/2005 | Hediger et al. |
| 6,879,998 | B1 * | 4/2005 | Raciborski et al. .......... 709/219 |
| 6,892,189 | B2 * | 5/2005 | Quass et al. .................. 706/12 |
| 6,910,073 | B2 * | 6/2005 | Banga et al. ................. 709/225 |
| 6,912,591 | B2 | 6/2005 | Lash |
| 6,944,817 | B1 | 9/2005 | Danneels |
| 6,981,017 | B1 * | 12/2005 | Kasriel et al. ................ 709/203 |
| 7,055,094 | B2 * | 5/2006 | Imielinski et al. ........... 715/239 |
| 7,058,700 | B1 | 6/2006 | Casalaina |
| 7,072,849 | B1 | 7/2006 | Filepp et al. |
| 7,072,987 | B2 | 7/2006 | Jurisch et al. |
| 7,092,977 | B2 | 8/2006 | Leung et al. |
| 7,092,997 | B1 * | 8/2006 | Kasriel et al. ................ 709/213 |
| 7,096,418 | B1 | 8/2006 | Singhal et al. |
| 7,185,063 | B1 * | 2/2007 | Kasriel et al. ................ 709/216 |
| 7,188,214 | B1 * | 3/2007 | Kasriel et al. ................ 711/118 |
| 7,194,682 | B2 * | 3/2007 | Warrington .................. 715/229 |
| 7,257,625 | B2 * | 8/2007 | Wu et al. ..................... 709/223 |
| 7,269,784 | B1 * | 9/2007 | Kasriel et al. ................ 715/205 |
| 7,296,051 | B1 * | 11/2007 | Kasriel ........................ 709/203 |
| 7,325,188 | B1 * | 1/2008 | Covington et al. ........... 715/234 |
| 7,483,955 | B2 | 1/2009 | Gupta et al. |
| 7,487,261 | B1 * | 2/2009 | Kasriel ........................ 709/246 |
| 7,502,858 | B2 | 3/2009 | Gupta et al. |
| 7,509,404 | B2 * | 3/2009 | Agrawal et al. .............. 709/223 |
| 2001/0037400 | A1 | 11/2001 | Raz |
| 2001/0056460 | A1 | 12/2001 | Sahota et al. |
| 2002/0004813 | A1 * | 1/2002 | Agrawal et al. .............. 709/201 |
| 2002/0032677 | A1 | 3/2002 | Morgenthaler et al. |
| 2002/0048450 | A1 | 4/2002 | Zetts |
| 2002/0056010 | A1 | 5/2002 | Lincoln et al. |
| 2002/0138509 | A1 | 9/2002 | Burrows et al. |
| 2002/0138511 | A1 | 9/2002 | Psounis et al. |
| 2002/0161860 | A1 | 10/2002 | Godlin et al. |
| 2003/0110186 | A1 | 6/2003 | Markowski et al. |
| 2003/0110296 | A1 | 6/2003 | Kirsch et al. |
| 2003/0120752 | A1 | 6/2003 | Corcoran |
| 2003/0154261 | A1 | 8/2003 | Doyle et al. |
| 2004/0128346 | A1 | 7/2004 | Melamed et al. |
| 2004/0172458 | A1 | 9/2004 | Pitts |
| 2004/0205165 | A1 | 10/2004 | Melamed et al. |
| 2006/0168118 | A1 | 7/2006 | Godlin et al. |
| 2006/0168348 | A1 | 7/2006 | Casalaina |

OTHER PUBLICATIONS

"Intelligent Prefetch in WWW Using Client Behavior Characterization" Swaminathan, N. Raghavan, S.V., International Symposium on Modeling, Analysis and Simulation of Computer and Telecommunication Systems, pp. 13-19, Sep. 2000.

"A Schema-Based Approach to Web Engineering" Kuhnke, C. Schneeberger, J. Turk, A., System Sciences, SCHEMA Electronic Documentation Solutions p. 10, Jan. 2000.

A Survey of Web Caching Schemes for the Internet: ACM SIGCOMM Computer Communication Review, pp. 36-46, Oct. 1999.

Client-Server Computing in Mobile Environment, Jin Jing. Abdelsalam Helal and Ahmed Elmagarmid, ACM Computing Surveys, vol. 31, No. 2, Jun. 1999.

"Active Cache: caching dynamic contents on the Web", Pei Cao, Jin Zhang and Kevin Beach, The British Computer Society, The Institution of Electrical Engineers & IOP Publishing Ltd., 1999.

U.S. Appl. No. 09/734,910, S. Kasriel.

U.S. Appl. No. 09/827,268, S. Kasriel.

U.S. Appl. No. 09/888,374, S. Kasriel.

Marshall Brian, How Stuff Works, "How Web Servers and the Internet Work," obtained at Internet address http://www.howstuffworks.com/web-server.htm, no date.

Accomazzi, A. "rproxy", 1999-2001 By Martin Pool.

Delphion Intellectual Property Network to search. "Welcom to the new world of IP Information, Delphion". [online] 1997-2001, Delphion, Inc., [retrieved on Jul. 24, 2001] Retrieved from the internet URL:http://www.delphion.com.

Goulde, M., Network Caching Guide: Optimizing Web Content Delivery, Boston, MA, Patricia Seybold Group, Mar. 1999 pp. i-42.

Mogul, J. et al, "HTTP Delta Clusters and Templates", Aug. 24, 2000. draft-mogul-http-dcluster-00.txt.

* cited by examiner

DIFFERENTIAL CACHING WITH TEMPLATE, SUB-TEMPLATE, AND DELTA INFORMATION

RELATED APPLICATIONS

This application is a Continuation Application of U.S. application Ser. No. 09/923,292, filed Aug. 6, 2001, entitled "Template Identification With Differential Caching" now issued as U.S. Pat. No. 7,092,997 on Aug. 15, 2006.

This application is related to the following patent and copending applications:

- U.S. patent application Ser. No. 09/436,136, entitled "Predictive Pre-Download of Network Objects," issued as U.S. Pat. No. 6,721,780 on Apr. 13, 2004;
- U.S. patent application Ser. No. 09/734,910, filed Dec. 11, 2000, entitled "Predictive Pre-Download Using Normalized Network Objects Identifiers", issued as U.S. Pat. No. 6,981,017 on Dec. 27, 2005;
- U.S. patent application Ser. No. 11/262,225, filed Oct. 28, 2005, entitled "Predictive Pre-Download of a Network Object";
- U.S. patent application Ser. No. 09/827,268, filed Apr. 4, 2001, entitled "Server-Originated Differential Caching", issued as U.S. Pat. No. 7,269,784 on Sep. 11, 2007;
- U.S. patent application Ser. No. 09/888,374, filed Jun. 22, 2001, entitled "Content Delivery Network Using Differential Caching", issued as U.S. Pat. No. 7,185,063 on Feb. 27, 2007; and
- U.S. patent application No. 11/679,158, filed Aug. 7, 2007, entitled "Delivering Content on a Network Using Differential Caching System and Method";
- U.S. patent application Ser. No. 09/923,809, filed Aug. 7, 2001, entitled "Efficient and Low-Cost Compression Using Differential Caching", issued as U.S. Pat. No. 7,188,214 on Mar. 6, 2007.

Each of these applications is hereby incorporated by reference as if fully set forth herein.

FIELD OF THE INVENTION

This invention relates to distinguishing different elements in a web page so as to reduce the bandwidth and computing resources required to transmit a web page over a network.

BACKGROUND OF THE INVENTION

One technique to optimize bandwidth usage and save computing resources involves responding to a request for a web page by looking to what information a client device may have already received from a server at an earlier point in time. Information included in a document may be distinguished from other information included in that same document by looking to how frequently the information changes and whether a user has the most recent version of that part of the document. Using these criteria, information in a document may be categorized as either (1) template information (including information that changes infrequently) or (2) delta information (including information that changes relatively frequently or is somehow personalized with respect to a user). Differential caching and service of template and delta information results in a saving of bandwidth and other computing resources because information that does not change frequently may be compressed and cached at a server that is relatively proximate to one or more end users.

Differential caching based upon the distinction between template information and delta information does not necessarily result in a substantial savings of bandwidth and computing resources under all conditions, particularly under those conditions when amount of delta information exceeds the amount of template information. For example, different elements in a personal web page, such as those provided by Yahoo, may change at very different rates with respect to each other.

For example, the headline stories presented to a user may change every hour, whereas elements associated with the user's decision to view a particular topic may change only occasionally, and still other elements (such as the title bars in a page or logos associated with the provider of the content) may change very rarely. Under these circumstances, the template contains relatively little information compared to the amount of delta information. Under these circumstances, differential caching may not significantly reduce the amount of bandwidth and other resources needed to transmit a web page because a large part of the page must be freshly obtained from the content delivery network or re-compressed every time it is transmitted.

Accordingly, it would be desirable to provide a technique for efficiently serving relatively non-static content in a content delivery network that does not suffer from the drawbacks of the known art.

SUMMARY OF THE INVENTION

In a first aspect of the invention, information in a document is categorized with respect to the number of times that the information is served to a client or a set of clients within a period of time. The information in a document may be categorized as (1) delta information (that is, information that changes rapidly or is unique to a particular user), (2) sub-template information (including information that changes less frequently than delta information, and (3) template information, which changes very seldom. For example, a personalized web page (such as those available through Yahoo) may include (1) template information, such as the Yahoo logo and associated headers; (2) one or more sets of sub-template information, such as news reports, televisions listings and comparable information that change at more or less regular intervals, and (3) delta information, such as personal messages to an individual, stock market quotes or other relatively ephemeral messages.

In a second aspect of the invention, both the template information and sub-template information are compressed and cached. Compressing and caching both sub-template information and template information results in a significant savings of bandwidth and computing resources, such as would be required if the sub-template information were treated as delta information and were not stored in a cache as is the case in the prior art. This savings is enhanced when the compressed template and sub-template information are sent to a large number of users.

In a preferred embodiment, the sub-template and template information are treated separately, so that each is compressed and cached in a different location or a different memory address from the other. When a user requests a document, the document may be comprised of template, sub-template and delta information, some of which the requesting user or other users may have seen before. Selective compression and caching of these elements with respect to the likelihood that these elements will change can result in a savings of bandwidth and computing resources that is not available in the prior art.

In a third aspect of the invention, the compressed and cached versions of the template and sub-template information are tagged with an indicator (referred to herein as an etag) that identifies the version number of a template or sub-template, so as to distinguish it from other, previous versions that a user may have received or that may be cached in a server, either in the content delivery network or on a proxy server. In a preferred embodiment, other types of electronic tags, such as place markers, are used to identify a location in the page where the material is to be inserted and provide other related information.

In a fourth aspect of the invention, a hierarchy of templates and sub-templates is created, so as to form a lattice structure where a given sub-template can be shared by multiple templates. In a first example, a personalized web page associated with a user may include some of the same sub-templates as a different personalized web page associated with a different user. In this example, a template is associated with each user or group of users; this template references sub-templates which contain portions of the contents of the page (e.g. a sub-template for the weather section of the page, a sub-template for the news section, and so on). Such sub-templates can be shared by several templates (as occurs when several users wish to watch the same news). In a second example, sub-templates can be used in a personalized media stream as when a user watches a news story which includes personalized advertisement. If the number of different personalized advertisement streams is much lower than the number of individual viewers, it is most efficient to treat each advertisement stream as a sub-template, personalization information as delta information and the rest of the data stream as a template.

In a preferred embodiment, differential caching of template and sub-template information and differential service of template, sub-template and delta information is particularly useful with respect to personalized web pages that are comprised of elements that can be configured in many different ways and sent to many different users. In other embodiments, this technique can be used with regard to database queries, streaming media and other information obtained from a network.

In a preferred embodiment, an encoder specifies how the final page is to be assembled, but not where the assembly should occur. Thus, the web page can be assembled, either in whole or in part, by any downstream element that (1) understands encoding and (2) has access to the cached information.

DETAILED DESCRIPTION

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

System Elements

Figure 1:
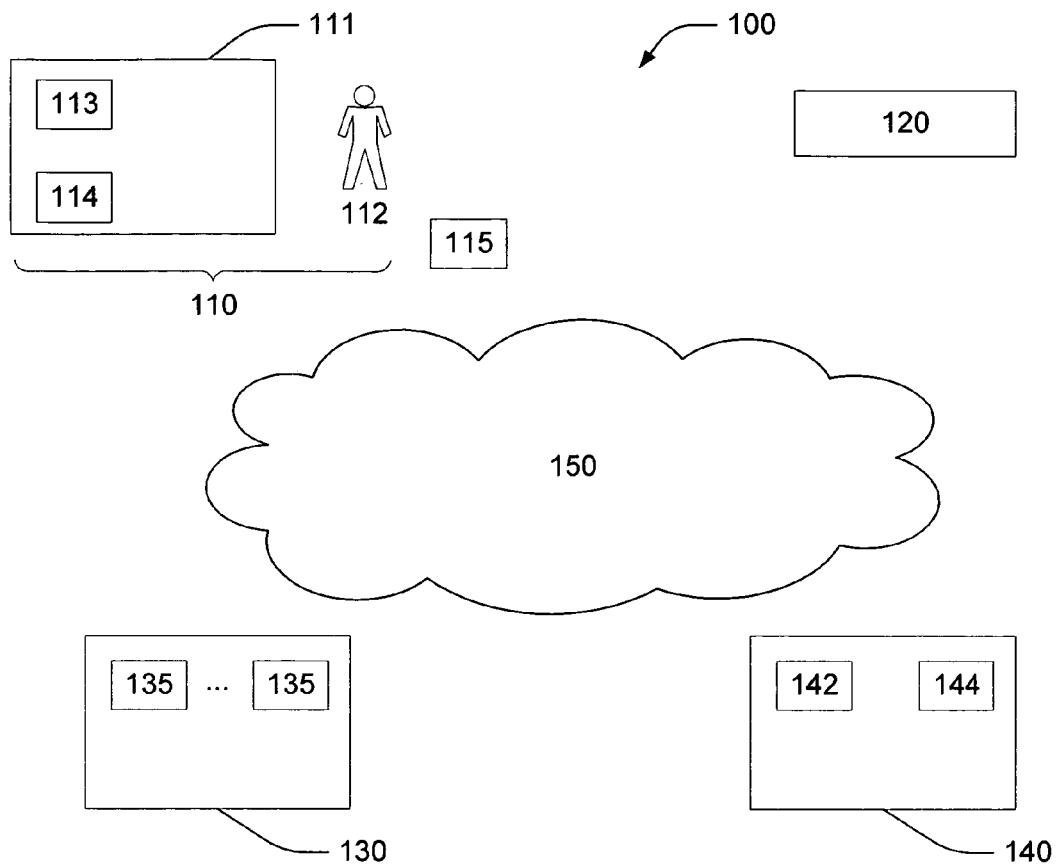
FIG. 1 is an overview of a system for new template identification with differential caching.

FIG. 1 is an overview of a system for new template identification with differential caching.

A system for new template identification with differential caching (shown by general character reference 100) includes one or more clients 110, an originating server 120, a content delivery network 130, a set of proxy encoder servers 140 and a communication network 150.

Each of the one or more clients 110 includes a client workstation 111 and a client operator 112.

The client workstation 111 includes a computing device, along with a local memory, operating system software and a display element. In a preferred embodiment, the computing device includes a personal computer, a hand held or laptop computer, a telephone interface (such as a cellular phone) to such a remote computer or any other device that fits the general Turing paradigm.

The client workstation 111 also includes a web browser 113. In some embodiments, the client workstation 111 also includes a decoder 114.

The web browser 113 (such as "Internet Explorer", "Netscape Navigator" or a comparable product) uses a message transfer protocol, such as HTTP (hypertext transfer protocol), or a variant thereof, to generate request messages 115 and receive content (for example, web pages or information from a database) or other messages from the content delivery network 130.

The decoder 114 is either a browser add-on or is coupled to a proxy server locally close to the client 110 (for example, an enterprise or ISP cache).

Regardless of location, the decoder 114 causes the web browser 113 to interact with the set of proxy encoder servers 140, identifies previous versions of content that have already been received, decompresses compressed content and integrates the various elements comprising the content into a display for presentation to the client operator 112. In a preferred embodiment, the decoder 114 is coupled to the web browser 113, preferably as a browser add-on.

Other embodiments (known as "clientless") do not include a decoder 114. In these clientless embodiments, the encoder encodes the templates and delta information at a level understandable by the browser 113 using DHTML, XML or some other scripting technique.

The client operator 112 might include one or more individual persons or a proxy for one or more such persons (for example, a human administrative assistant, or a computer program or other artificial intelligence system acting on behalf of another).

The Originating Server and Content Delivery Network

The originating server 120 includes a processor, computer program and data memory, and operates under control of software to perform the tasks described herein. It is capable of using a message transfer protocol, such as HTTP or a variant thereof, to receive request messages 115 for documents (for example, web pages) from clients 110, the content delivery network 120 or the proxy encoding server 140 and to respond to those request messages 115. In a preferred embodiment, the originating server 120 is the original provider of content.

The content delivery network 130 includes a set of mirroring servers 135 situated in different locations throughout the network so as to minimize bandwidth required to respond to request messages 115. Similar to the originating server 120, the content delivery network 130 includes at least one processor, computer program and data memory, operates under control of software and is capable of using a message transfer protocol, such as HTTP or a variant thereof, to receive request messages 115 for documents.

In a preferred embodiment, both the originating server 120 and the content delivery network 130 each include a database of documents such as web pages, embedded objects for web pages, databases or any information such as may be requested by a client operator 112.

In alternative embodiments, the content delivery network 130 may also include various databases for caching template information, sub-template information, delta information to be inserted into template or sub-template web pages, and code fragments or compressed versions of any of the above. In both preferred and alternative embodiments, the mirroring servers 135 include most or all of the same content as the originating server 120, but are positioned more locally to the client device 110. Information is served from the mirroring servers 135 to the client devices 110 so as to minimize bandwidth used to transmit content to a client device 110. In this way, the mirroring servers 135 act as a unified content delivery network 130.

Proxy Encoder Server

Similar to originating servers 120 and mirroring servers 135, the proxy encoder server 140 also includes a processor, computer program and data memory, and operates under control of software to perform the tasks described herein. The proxy encoder server 140 also includes compression software 142 and software 144 for identifying elements in a web page. Compression software 142 may include gzip or glib or some other comparable product that performs a compression algorithm such as Huffman coding or arithmetic coding. Software 144 for identifying elements in a web page can (1) distinguish, (2) isolate and (3) tag template information, sub-template information and delta information prior to compression, as well as (4) cache the compressed information.

The proxy encoder server 140 is capable of using a message transfer protocol, such as HTTP or a variant thereof, to receive request messages 115 for documents (such as for example, web pages) from clients 110, the content delivery network 130 or the originating server 120 and to respond to those request messages 115.

In a preferred embodiment, proxy encoder servers 140 are logically local to the originating server 120. However, in other embodiments, they may be positioned between the client devices 110 and the content delivery network 130. Requests from the client device 110 that are originally directed to the originating server 120 or the content delivery network 130 are redirected to the proxy encoder server 140. In a preferred embodiment, the proxy encoder server 140 is transparent to the client device 110, the originating server and the content delivery network 130.

Communication Network

Client devices 110, the originating server 120, the content delivery network 130 and the proxy encoder server 140 are coupled using a communication network 150. In a preferred embodiment, the communication network 150 includes a computer communication network, such as the Internet. However, in alternative embodiments, the communication network 150 might include an intranet, extranet, VPN (virtual private network), ATM system, a portion of a private or public PSTN (public switched telephone network), a frame relay system, or any other communication technique capable of performing the functions described herein.

Content Distribution

In a preferred embodiment, request messages 115 are generated by the client 110. The request messages 115 are sent directly to the content delivery network 130 or the originating server 120. If there is a proxy encoder 140 "in front" of either the content delivery network 130 or the originating server 120, the request message 115 will be received by the proxy encoder 140. The actions of the proxy encoder 140 are transparent to both the client 110 and the server. The proxy encoder server 140 retrieves the document, including template information and sub-template information (if such information is available) from the content delivery network 130. If template and sub-template information are not available, software 144 is used to dissect web page and break it down into template information, sub-template information or delta information. Each of these components separately compressed, tagged with an etag to provide additional information and cached at the proxy encoder server 124.

In an alternative embodiment, each mirroring server 135 maintains a copy of template information and sub-template information for a particular document. When the document is requested by a client 110, the mirroring server 135 provides the template information and sub-template information to the client 110 from its cache, while obtaining the delta information from the originating server 120 (or from a content distribution network 130 similarly disposed for distributing delta information). Sending the template information and sub-template information from the originating server 120 to the mirroring servers 135 is separate from sending the delta information from the originating server 120 to the client 110.

In a preferred embodiment, partial assembly of the template and sub-template information may occur at the mirroring server 135 or any other server that understands encoding and has access to the cached information. In this embodiment, the client 110 does not have to make multiple requests to the mirroring server 135 for different information. This is particularly beneficial to the client 110 who generally requires the total document, rather than the individual sub-templates.

Figure 2:
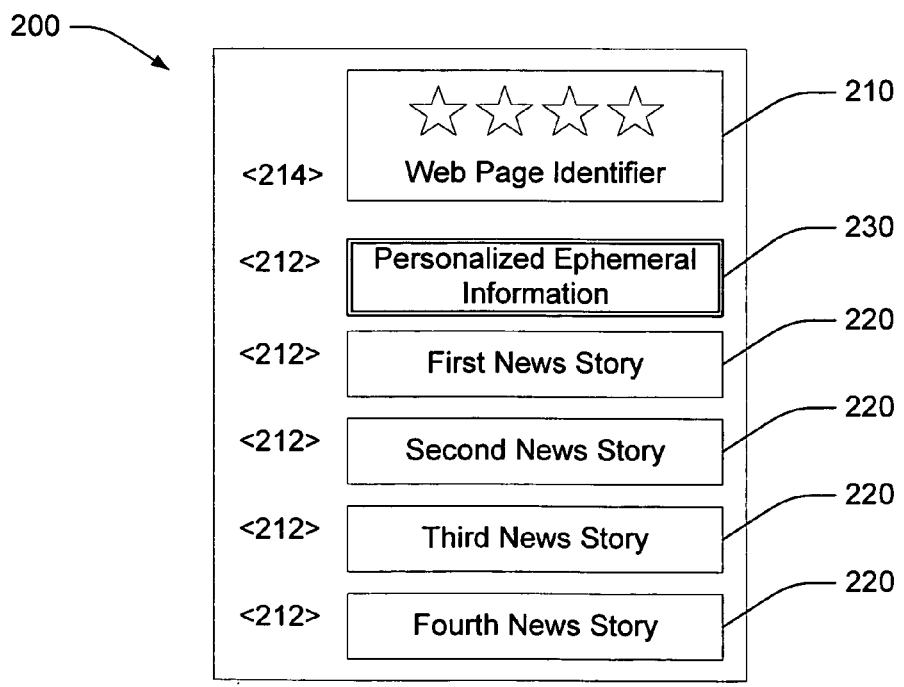
FIG. 2 is an exemplary view of different elements in a web page that are differentially cached.

FIG. 2 is an exemplary view of different elements in a document that can be differentially cached.

The document (indicated by general character reference 200) includes template information 210 (also referred to as a "template"), sub-template information 220 (also referred to as a "sub-template") and delta information 230 (also referred to as a "delta").

Template information 210 (shown in the document 200 as a web page identifier) includes information that is relatively static and does not change frequently. For example, template information 210 may include logos associated with the site provider, title bars that identify the type of information that follows, a list of stocks in a user's portfolio for which the user frequently requests market quotes and other information that does not change frequently.

In a preferred embodiment, the template information 210 is embedded with place markers 212. Place markers 212 are used to define a location for the insertion of sub-template information 220 and delta information 230.

In a preferred embodiment, after the document 200 is requested by a client device 110, the template information 210 is compressed and cached in an address associated with at least one location, such as the proxy encoder server 140 or a mirroring server 135. An etag 214 identifies the version number of the template information 210.

Sub-template information 220 includes information that changes relatively frequently, such as a breaking news story, television listings that remain relatively constant for a day, an unchanging weather report and other comparable features. It is not uncommon for sub-template information 220 to be inserted in different locations in a web page during the course of a day. Similarly, different users may display identical sub-template information 220 in different places in their personal web pages. Under these conditions, the sub-template information 220 remains unchanged except for its location in a page. As noted above, place markers 212 are used to position such material in a document 200.

Similar to template information 210, sub-template information 220 is compressed and cached at least one of a number of possible locations, including the mirroring server 135 and the proxy encoder server 140. An etag 214 identifies the version number of the sub-template information 220.

Delta information 230 includes relatively ephemeral information such as stock quotes, personalized reminders to a client operator 112, advertising content (such as banner ads), weather reports and similar matter that changes frequently.

In a preferred embodiment, delta information 230 is not compressed or cached, but served directly to the client device 110 either by way of the proxy encoder 140 or directly from the content delivery network 130. In other embodiments, the delta information 230 may be compressed and cached if it will be reused at a future point in time (such as rotating banner advertisements).

Place markers 212 identify the location where delta information 230 may be inserted into the template information 210. For-example, if template information 110 includes a list of stocks for which the client operator 112 requests quotes, the place marker 212 for the delta information (that is the individual stock quotes) will be embedded adjacent to the associated stock names.

In another embodiment, the delta 230 includes code describing where and how to combine the sub-template(s) 220 with the template 210 to generate the document. Such embodiments do not require place markers 212 or 214.

Method of Operation

Figure 3:
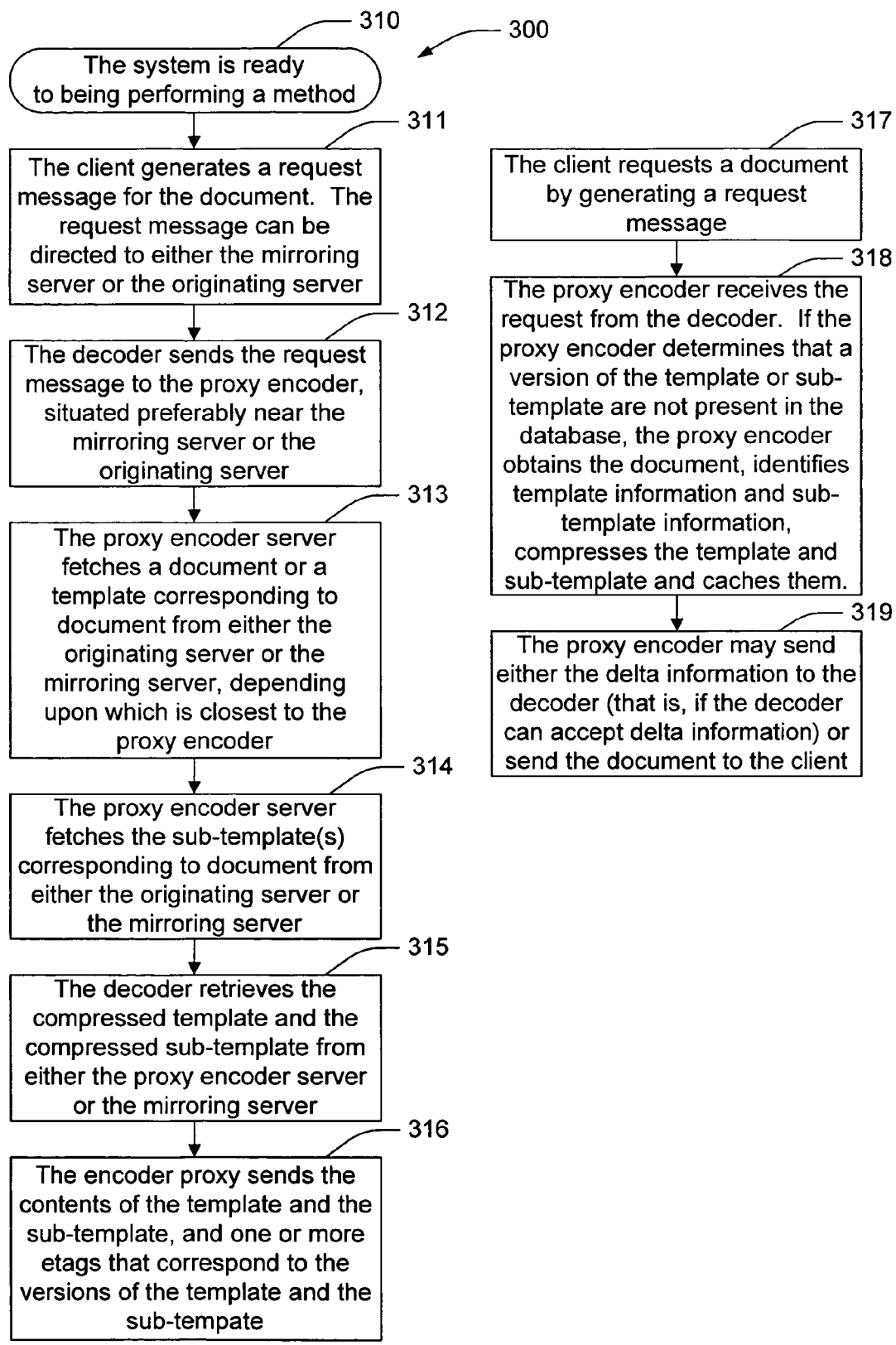
FIG. 3 is a flow diagram, illustrating a method for using a system for new template identification with differential caching.

FIG. 3 is a flow diagram, illustrating a method for using a system for new template identification with differential caching.

A method 300 includes a set of flow points and process steps as described herein.

The method 300 is performed by the system 100. Although the method 300 is described serially, the steps of the method 300 can be performed by separate elements in conjunction or parallel, whether asynchronously, in a pipelined manner, or otherwise. There is no particular requirement that the method. 300 be performed in the same order in which this description lists the steps, except where so indicated.

At a flow point 310, the system 100 is ready to begin performing a method 300.

At a step 311, the client 110 generates a request message 115 for the document 200. The request message 115 can be directed to either the mirroring server 135 or the originating server 120. In a preferred embodiment, the request message 115 is made using the decoder 114, preferably on the client's web browser 113.

In a step 312, the decoder 114 sends the request message 115 to the proxy encoder 140, situated preferably near the mirroring server 135 or the originating server 120. Since the request message 115 was sent through the decoder 114, the proxy encoder server 140 knows that the client can integrate template information 210, sub-template information 220 and delta information 230 and is otherwise compatible with systems that provide delta encoding.

In "clientless" versions (that is, those clients without a decoder 114) the request message 115 goes directly from the browser 113 to the proxy encoder server 140, bypassing the decoder 114.

In a step 313, the proxy encoder server 140 fetches a document 200 from either the originating server 120 or the mirroring server 135, depending upon which is closest to the proxy encoder 140. After obtaining this content, the proxy encoder 140 updates the template 210 for the document 200 and compresses the updated template 210. In the event that there is not a template 210 associated with document 200, the proxy encoder 140 generates a template 210, compresses the template 210 and caches it.

In a step 314, the proxy encoder 140 determines whether sub-templates 220 are desirable and constructs the sub-template(s) 220. This is done by looking to the size of the delta information 230. If the delta 230 is very large with respect to the template 210 and includes regularized information, that regularized information is isolated and used as a sub-template 220. As with the template information 210, the proxy encoder 140 compresses and caches the sub-template information 220.

In "clientless" embodiments, the proxy encoder 140 responds directly with the delta information 230. In such embodiments, the delta information 230 is an HTML page that includes a reference to template information 210, one or more sets of sub-template information and delta information 230 (wherein the template 210, the sub-template 220 are Javascripts and the delta information includes a set of Javascript instructions). In this embodiment, the Javascript instructions comprising the delta information 230 tell the browser 113 how to transform the template information 210 and sub-template information 220 into the correct HTML document. Other embodiments may use DHTML or other scripting techniques; still others may express the delta information as an XML page or a WML document.

In a step 315, the decoder 114 retrieves the compressed template 210 and the compressed sub-template 220 from either the proxy encoder server 140 or the mirroring server 135, (depending where the proxy encoder 140 specified the compressed template 210 and compressed sub-template were cached in the previous step) by making a request, either immediately or at a later point in time. Upon retrieving the compressed template 210 and compressed sub-template information 220, the decoder 114 decompresses them, and inserts the sub-template information as directly by the place markers 212.

In the clientless version, the browser 113 automatically and immediately retrieves the template 210 and the sub-template 220 from the site specified in the previous step.

In a step 316, the proxy encoder 140 sends the contents of the template 210 and sub-template 220, and one or more etags 214 that correspond to the versions of the template 210 and the sub-template 220.

If the contents and etag 214 are sent from the mirroring server 135, then the mirroring server 135 searches its cache for the template 210 and sub-template 220. If the template 210 and sub-template 220 are present in its cache, the mirroring server 135 sends the template 210 and the sub-template 220 directly to the client 110. However, if either or both of these elements are not present in the cache, then the mirroring server 135 automatically fetches the missing element from the encoder proxy 140, caches the fetched element, and sends the element to the client 110.

The following steps occur when a client operator 112 (either the same client operator or a different one) subsequently requests the document 200.

In a step 317, the client 110 requests a document 200 by generating a request message 115. Similar to steps 310 and 311, the decoder 114 directs the request to the proxy encoder 140, changing as to further specify a version number that is used to ascertain if changes have occurred.

In a step 318, the proxy encoder 140 receives the request from the decoder 114. If the proxy encoder 140 determines that a version of the template 210 or sub-template 220 are not present in the database, the proxy encoder 140 obtains the document 200 from either the originating server 120 or the mirroring server 135, identifies template information 210 and sub-template information, compresses the template 210 and sub-template 220 and caches them.

If, however, the template 210 and the sub-template 220 are available, the proxy encoder 140 calculates the differences between the versions of template 210 and sub-templates 220 that are available in the database and a newer version of the document 200 such as may be available from the originating server 120 or the mirroring server 135. These differences may involve changes in the location where the sub-template is displayed (for example, two different users may choose to have the same information in a personal web page displayed in different locations). Such changes are not true delta information 230 because they can be remedied by positioning information that is already present in a cache differently in a document 200. Other differences may be true delta information 230.

In a step 319, the proxy encoder 140 may send either the delta information 230 to the decoder 114 (that is, if the decoder 114 can accept delta information 230) or it sends the document 200 to the client 110.

Steps 317 through 319 are described with respect to a client-server implementation. In the "clientless" version, the proxy encoder server 140 does not need to know which version of the template 210 and sub-template 220 are at the client 110. This information is not needed because the proxy encoder server 140 makes this decision a priori and instructs the client 110 to use a specific version of these elements. Under these circumstances, steps 317-318 in the "clientless" version involve the browser 113 (rather than the decoder 114) directing the request message 115 to the proxy encoder 140.

Alternative Embodiments

Although preferred embodiments are disclosed herein, many variations are possible which remain within the concept, scope and spirit of the invention; these variations would be clear to those skilled in the art after perusal of this application.

The invention claimed is:

1. A system including a server, the server comprising:
   a processor;
   a memory; and
   a software module containing a computer program which when executed by the processor in the server causes the server to:
   (i) dissect a web page retrieved from another server into plurality of components of the web page,
   (ii) categorize and store each of the plurality of components into at least three storage categories in the memory, wherein at least one of the plurality of components of the web page is stored in each of the at least three storage categories, the at least three storage categories comprising template information, sub-template information, and delta information, the template information comprising seldom changing elements of a web page, the sub-template information comprising: (a) information that changes less frequently than delta information, and (b) elements of a web page shared by several templates, the delta information comprising information that changes more frequently than the template information and sub-template information,
   (iii) retrieve at least one of the template information, sub-template information, and delta information from the memory based on a request for information received by the server from a client device, and
   (iv) respond to the request by sending to the client device both the retrieved information and other components of a particular web page retrieved from a location other than the memory, wherein the server is a server in a content delivery network other than an originating server that is an original provider of the information requested by the client device, the content delivery network comprising a set of mirroring servers situated in different locations throughout a communication network and at least one of the mirroring servers being positioned locally to the client device, each of the mirroring servers includes components of web pages stored in a memory, wherein the components of web pages are categorized into the storage categories of template information and sub-template information.

2. The system of claim 1 wherein the server is one of a proxy encoding server and one of the mirroring servers within the content delivery network, the server including a software module containing a computer program which when executed by the processor in the server causes the server to intercept requests for information from the client device that are intended for the originating server.

3. The system of claim 2 wherein the software module in the server contains a computer program which when executed by the processor in the server causes the server to further retrieve the template information and sub-template information from memory in one of the mirroring servers in the content delivery network.

4. The system of claim 2 wherein the memory comprises a database containing the storage categories of template information and sub-template information.

5. The system of claim 2 wherein the software module in the server further contains a computer program which when executed by the processor in the server causes the server to (i) tag the template information to identify a version of the template information and (ii) tag the sub-template information to identify a version of the sub-template information.

6. The system of claim 1 further comprising a software module in the server containing a computer program which when executed by the processor in the server causes the server to (i) compress template information, (ii) compress the sub-template information, and (iii) cache the compressed template information in the memory in a memory address location different from the compressed sub-template information.

7. The system of claim 1 wherein the template information is embedded with place markers that define a location for insertion of sub-template information and delta information in the template information when assembling a web page.

8. The system of claim 1 further including a decoder coupled to a user's browser in the client device that integrates template information, sub-template information and delta information into a display for presentation to a user in the user's browser as an assembled web page.

9. A method performed by a server having a processor and memory operating under the control of a computer program within a storage module, the method comprising steps of:

dissecting a web page retrieved from another server into plurality of components of the web page and storing the plurality of components of the web page by dividing the plurality of components into at least three storage categories and storing each of the plurality of components in the memory wherein at least one of the plurality of components of the web page is stored in each of the at least three storage categories, the at least three storage categories comprising: template information, sub-template information, and delta information, the template information comprising seldom changing elements of a web page, the sub-template information comprising: (i) information that changes less frequently than delta information, and (ii) elements of a web page shared by several templates, the delta information comprising information that changes more frequently than the template information and sub-template information;

retrieving at least one of the template information, the sub-template information, and the delta information from a first location other than an originating server that is the original provider of information requested by a client device based on a request for information received by the server from the client device, wherein the server is a server in a content delivery network other than the originating server, the content delivery network comprising a set of mirroring servers situated in different locations throughout a communication network and at least one of the mirroring servers being positioned locally to the client device, each of the mirroring servers includes components of web pages stored in a memory, wherein the components of the web pages are divided into the storage categories of template information and sub-template information; and responding to the request by sending to the client device both the retrieved information and other components of a particular web page retrieved from a second separate and distinct location.

10. The method of claim 9 wherein the server comprises one of a proxy encoding server and one of the mirroring servers within a content delivery network, the method further comprising a step of redirecting the request for information from the client device to the server where that request was intended for the originating server.

11. The method of claim 10 wherein the redirecting step is performed by a decoder coupled to a user's browser in the client device.

12. The method of claim 10 wherein the retrieving step comprises retrieving the template information and sub-template information from one of the mirroring servers in the content delivery network.

13. The method of claim 10 wherein the responding step comprises integrating template information, sub-template information and delta information at the server into an assembled web page.

14. The method of claim 9 wherein the dissecting step includes tagging the template information to identify a version of the template information, subsequently the identified version of the template information is retrieved and sent to the client device in the retrieving and responding steps, respectively.

15. The method of claim 9 wherein the dissecting step includes tagging the sub-template information to identify a version of the sub-template information, subsequently the identified version of the sub-template information is retrieved and sent to the client device in the retrieving and responding steps, respectively.

16. The method of claim 9 wherein the dissecting step comprises identifying delta information that is relatively ephemeral information.

17. The method of claim 9 further comprising a step of compressing and caching the template information, and the retrieving step comprising retrieving and decompressing the compressed, cached template information.

18. The method of claim 9 further comprising a step of compressing and caching the sub-template information, and the retrieving step comprising retrieving and decompressing the compressed, cached sub-template information.

19. The method of claim 9 wherein the-template information is embedded with place markers that define a location for insertion of-sub-template information and delta information in the template information when assembling a web page while performing the responding step.

20. The method of claim 9 wherein the responding step comprises integrating template information, sub-template information and delta information in a decoder coupled to a user's browser in the client device into a display for presentation to a user in the user's browser as an assembled web page.

* * * * *